(12) United States Patent  
Clever et al.

(10) Patent No.: US 8,117,748 B2
(45) Date of Patent: Feb. 21, 2012

(54) BALLIZE IN TENSION CAMSHAFT ASSEMBLY PROCESS

(75) Inventors: Glenn E. Clever, Washington, MI (US); James Fawcett, Clarkston, MI (US)

(73) Assignee: GM Global Technology Operations LLC

( * ) Notice: Subject to any disclaimer, the term of this patent is extended or adjusted under 35 U.S.C. 154(b) by 627 days.

(21) Appl. No.: 12/248,108

(22) Filed: Oct. 9, 2008

(65) Prior Publication Data

US 2010/0088889 A1    Apr. 15, 2010

(51) Int. Cl.
*B21D 53/84* (2006.01)
(52) U.S. Cl. .......................... 29/888.1; 29/523
(58) Field of Classification Search .................. 29/888.1, 29/523
See application file for complete search history.

(56) References Cited

U.S. PATENT DOCUMENTS

| 4,575,913 | A | * | 3/1986 | Sugiuchi et al. | 29/432 |
| 5,437,097 | A | * | 8/1995 | Yanagawa | 29/888.1 |
| 6,615,468 | B2 | * | 9/2003 | Bloecker et al. | 29/281.1 |

* cited by examiner

*Primary Examiner* — David Bryant
*Assistant Examiner* — Moshe Wilensky
(74) *Attorney, Agent, or Firm* — Harness, Dickey & Pierce, P.L.C.

(57) ABSTRACT

A method may include locating first and second lobe members of a camshaft on a first shaft. The first shaft may include an annular wall defining a bore. The first lobe member may be located on a first portion of the first shaft and may define a first end of the camshaft. The second lobe member may be located on a second portion of the first shaft and may define a second end of the camshaft. The first shaft may be fixed from axial displacement and a tool may be displaced through the bore of the first shaft to fix the first lobe member to the first shaft. The fixing may include the first shaft being free from axial restraint in a first axial direction extending from the first portion of the first shaft to the second portion of the first shaft.

18 Claims, 4 Drawing Sheets

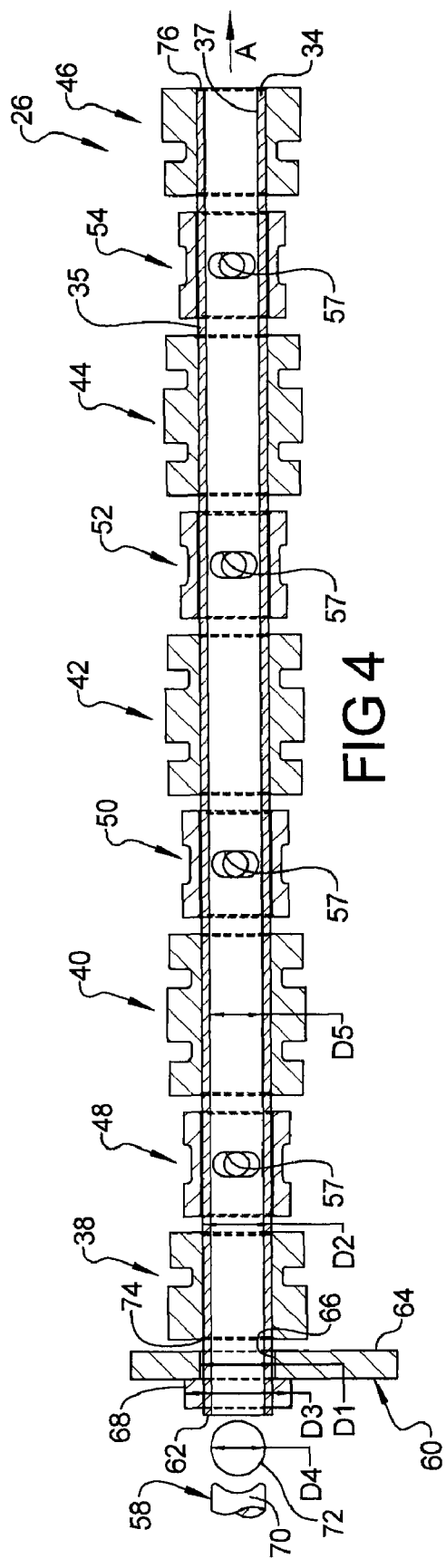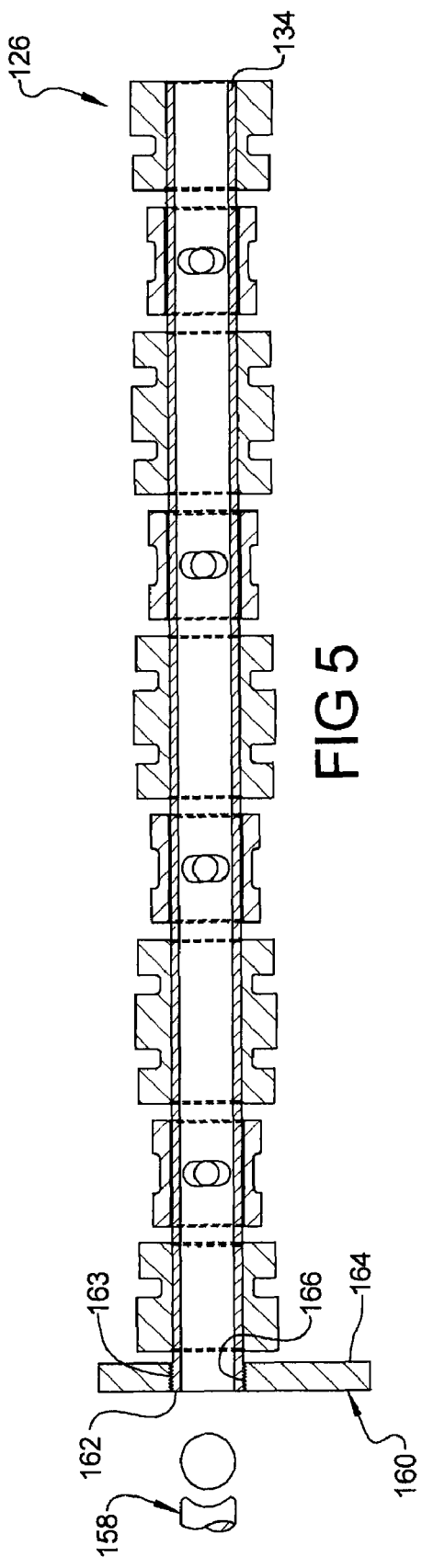

BALLIZE IN TENSION CAMSHAFT ASSEMBLY PROCESS

FIELD

The present disclosure relates to engine camshaft assemblies, and more specifically to concentric camshaft assemblies.

BACKGROUND

The statements in this section merely provide background information related to the present disclosure and may not constitute prior art.

Engines typically include a camshaft to actuate intake and exhaust valves. Some camshafts are concentric camshafts that provide for relative rotation between, for example, the intake and exhaust lobes. The intake lobes may be fixed to an outer shaft for rotation with the shaft and the exhaust lobes may be rotatably supported on the shaft. Alternatively, the exhaust lobes may be fixed to the outer shaft for rotation with the shaft and the intake lobes may be rotatably supported on the shaft. In any arrangement, the lobes that are fixed to the shaft may be fixed by forcing a tool axially through a bore of the shaft.

SUMMARY

A method may include locating first and second lobe members of a camshaft on a first shaft. The first shaft may include an annular wall defining a bore. The first lobe member may be located on a first portion of the first shaft and may define a first end of the camshaft. The second lobe member may be located on a second portion of the first shaft and may define a second end of the camshaft. The first shaft may be fixed from axial displacement and a tool may be displaced through the bore of the first shaft to fix the first lobe member to the first shaft. The fixing may include the first shaft being free from axial restraint in a first axial direction extending from the first portion of the first shaft to the second portion of the first shaft.

An alternate method may include locating a series of lobe members of a camshaft on a first shaft. The first shaft may have an annular wall defining a bore. A first of the lobe members may be located on a first portion of the first shaft and may define a first end of the camshaft. A remainder of the lobe members may be located on the first shaft in a first axial direction outward from the first lobe member. The first shaft may include an end portion extending outward from the first lobe member in a second axial direction opposite the first axial direction. The end portion of first shaft may be fixed to a fixture in a manner limiting axial displacement between the first shaft and the fixture. The fixing may include the first shaft being free from axial restraint in the first axial direction. A tool may be displaced through the bore of the first shaft in the first axial direction to fix at least one of the lobe members to the first shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a schematic illustration of a portion of the camshaft of FIG. 2, a tool assembly, and a fixture according to the present disclosure; and FIG. 5 is a schematic illustration of an alternate camshaft, tool assembly, and fixture according to the present disclosure.

DETAILED DESCRIPTION

Figure 1:
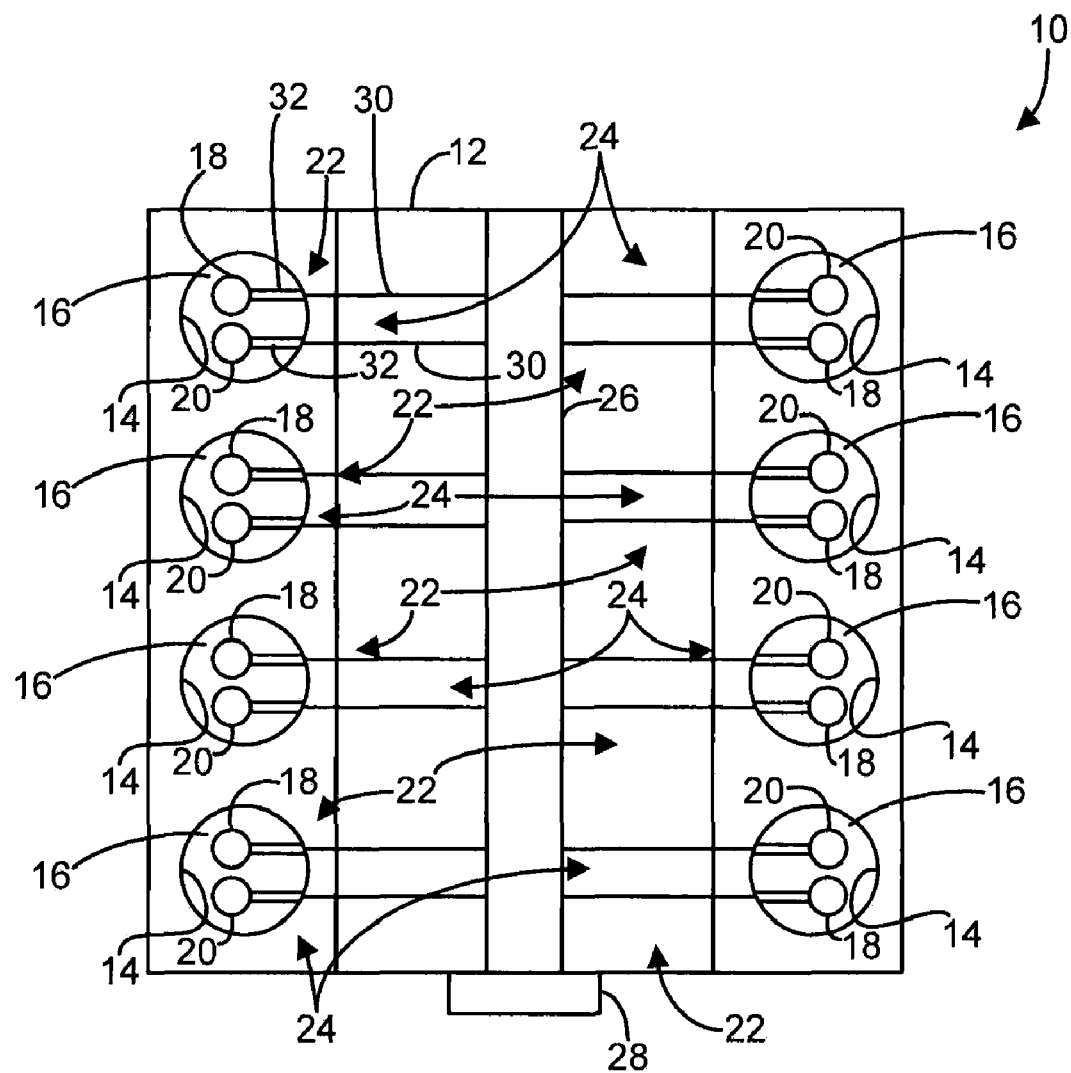
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine 12 including a plurality of cylinders 14 having pistons 16 disposed therein. The engine 12 may further include an intake valve 18, an exhaust valve 20, and intake and exhaust valve lift mechanisms 22, 24 for each cylinder 14, as well as a camshaft 26 and a cam phaser 28.

The intake valve lift mechanism 22 may include a pushrod 30 and a rocker arm 32. The exhaust valve lift mechanism 24 may additionally include a pushrod 30 and a rocker arm 32. Pushrods 30 may be engaged with the camshaft 26 to actuate the rocker arms 32 and selectively open the intake and exhaust valves 18, 20. While the engine assembly 10 is illustrated as a pushrod engine, it is understood that the present disclosure is not limited to pushrod engines and may be applicable to a variety of other engine configurations as well, such as overhead cam engines.

Figure 2:
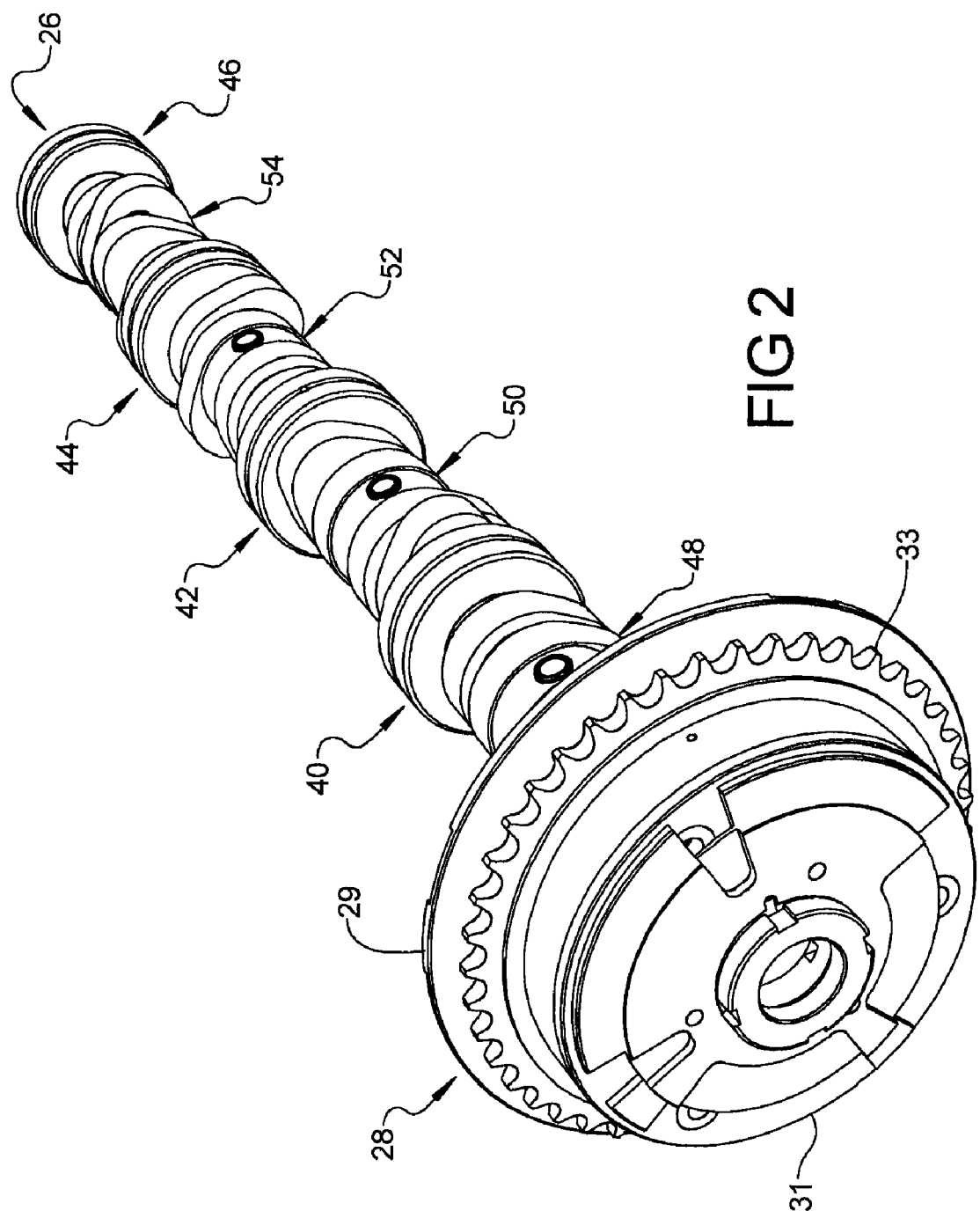
FIG. 2 is a perspective view of the camshaft and cam phaser of FIG. 1.
Figure 3:
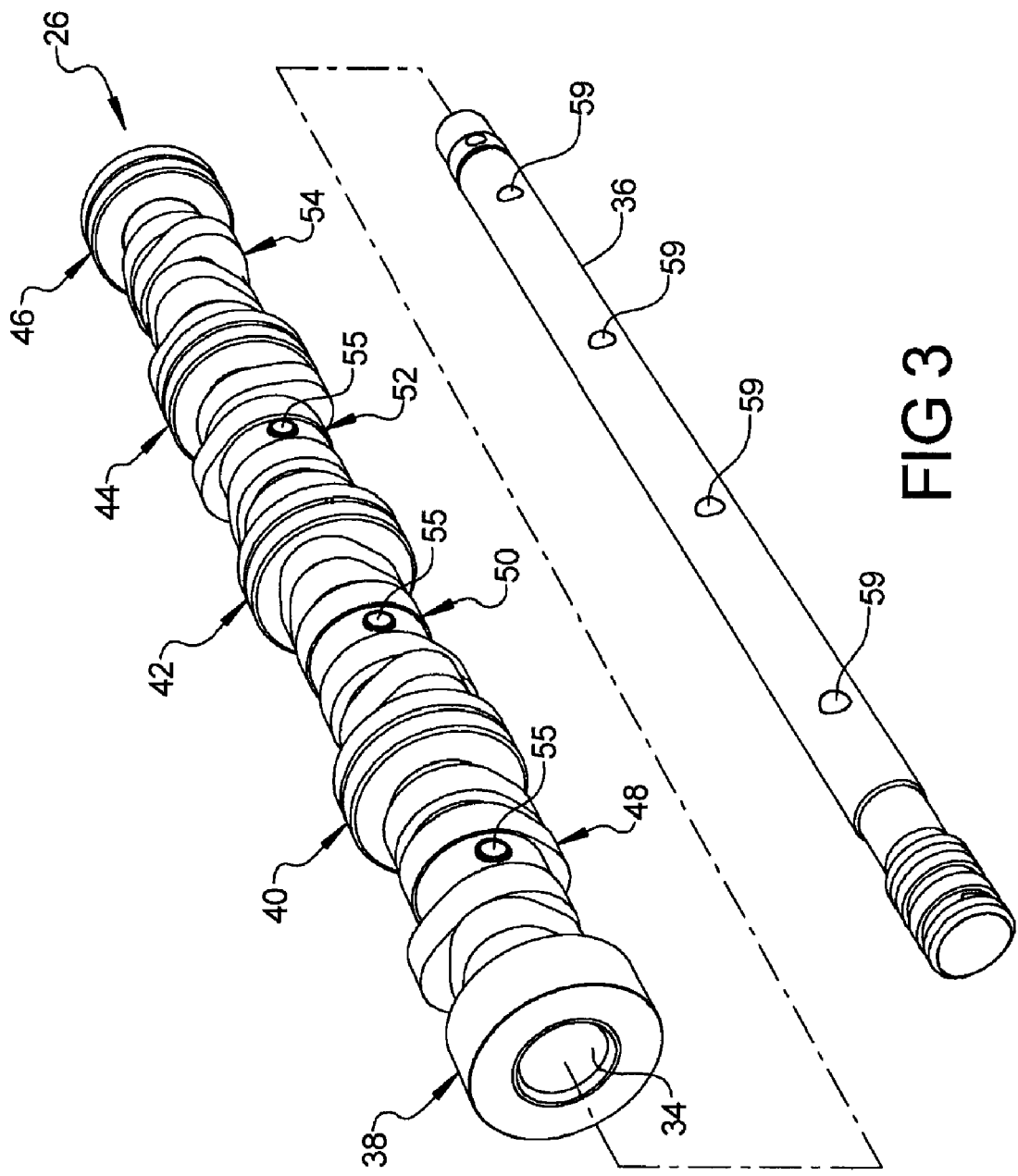
FIG. 3 is a perspective exploded view of the camshaft of FIG. 2.

With reference to FIGS. 2-4, the camshaft 26 may include first and second shafts 34, 36, a first set of lobe members 38, 40, 42, 44, 46, a second set of lobe members 48, 50, 52, 54, and drive pins 55. In the present example, the first set of lobe members 38, 40, 42, 44, 46 may form an intake lobe set and the second set of lobe members 48, 50, 52, 54 may form an exhaust lobe set. However, it is understood that alternate arrangements may be provided where the first set of lobe members 38, 40, 42, 44, 46 may form an exhaust lobe set and the second set of lobe members 48, 50, 52, 54 may form an intake lobe set. Further, each of the first and second sets of lobe members 38, 40, 42, 44, 46, 48, 50, 52, 54 are not limited to only intake or exhaust valves. For example, the first and second sets of lobe members 38, 40, 42, 44, 46, 48, 50, 52, 54 may each include an intake lobe and/or an exhaust lobe. The first shaft 34 may be fixed for rotation with a first phaser member 29 and the second shaft 36 may be fixed for rotation with a second phaser member 31. The first and second phaser members 29, 31 may be rotatable relative to one another and relative to a rotationally driven member 33 of the phaser 28.

The first shaft 34 may include an annular wall 35 defining an inner bore 37. The second shaft 36 may be rotatably disposed within the inner bore 37 of the first shaft 34. The first shaft 34 may include slots 57 (seen in FIG. 4) therethrough and the second shaft 36 may include apertures 59 that receive the pins 55 therein and couple the second set of lobe members 48, 50, 52, 54 for rotation with the second shaft 36. The slots 57 in the first shaft 34 may generally allow for a rotational travel of the pins 55 therein.

The first set of lobe members 38, 40, 42, 44, 46 may be fixed for rotation with the first shaft 34. The engagement between the first set of lobe members 38, 40, 42, 44, 46 and the first shaft 34 may include a friction fit engagement. The second set of lobe members 48, 50, 52, 54 may be disposed between adjacent ones of the first set of lobe members 38, 40, 42, 44, 46. A tool 58 (seen in FIG. 4) may deform the first shaft 34 in an outward radial direction to fix the first set of lobe members 38, 40, 42, 44, 46 to the first shaft 34.

Referring to FIG. 4, in order to fix the first set of lobe members 38, 40, 42, 44, 46 to the first shaft 34, a fixture 60 may be used to axially fix an end portion 62 of the first shaft 34. In a first non-limiting example, the fixture 60 may include a frame 64 having an aperture 66 passing therethrough. The end portion 62 of the first shaft 34 may extend axially outward from the lobe member 38 and may be used as a mounting region for axially fixing the first shaft 34 relative to the fixture 60. A stop member 68 may be fixed to the end portion 62 of the first shaft 34, locating the frame 64 axially between the stop member 68 and the lobe member 38. The stop member 68 may be fixed to the first shaft 34 in a variety of ways including a welded engagement, a friction fit engagement, a threaded engagement, or any other manner to fix the stop member 68 from axial displacement along the first shaft 34. The aperture 66 in the frame 64 may have a diameter (D1) that is greater than the outer diameter (D2) of the first shaft 34 and less than the outer diameter (D3) of the stop member 68.

The tool 58 may include a shaft 70 and a deforming member 72. The deforming member 72 may have an outward radial extent that is greater than an initial outward radial extent of the first shaft 34. In the present example, the deforming member 72 may be generally spherical, having an outer diameter (D4) that is greater than an inner diameter (D5) of the first shaft 34. During assembly of the camshaft 26, the first shaft 34 may be fixed axially relative to the fixture 60 as discussed above. Once the first shaft 34 is fixed, the first set of lobe members 38, 40, 42, 44, 46 and the second set of lobe members 48, 50, 52, 54 may be located on the first shaft 34. The tool 58 may then be forced in an axial direction (A) through the inner bore 37 of the first shaft 34. The greater diameter (D4) of the deforming member 72 may force the annular wall 35 in an outward radial direction and into engagement with the first set of lobe members 38, 40, 42, 44, 46.

The entirety of the first shaft 34 may be free from axial restraint in the axial direction (A) from the lobe member 38 to the lobe member 46. However, it is understood that the first shaft 34 may be supported at a location between the lobe members 38, 46 in a manner that allows for axial displacement of the first shaft 34. As a result of the support of the first shaft 34 by the fixture 60, the first shaft 34 may be allowed to expand in the axial direction (A) as the deforming member 72 is forced through the first shaft 34. This axial expansion may limit any non-linearities introduced into the first shaft 34 by the deforming member 72.

Once the first set of lobe members 38, 40, 42, 44, 46 are axially fixed on the first shaft 34, the first shaft 34 may be removed from the fixture 60. Removal of the first shaft 34 may include removal of the end portion 62 of the first shaft 34. Once the end portion 62 has been removed, the first end 74 of the first shaft 34 may generally terminate at the lobe member 38 and the second end 76 may generally terminate at the lobe member 46. Therefore, during the fixation of the first set of lobe members 38, 40, 42, 44, 46 to the first shaft 34, an entirety of the first shaft 34 from the first end 74 to the second end 76 may continuously be under tension. Further, due to the lack of axial restraint at any region axially outward from the first end 74, the first shaft 34 may be free from compression during the entire deforming process applied by the tool 58.

The lack of a compressive force on the first shaft 34 may generally provide for a linear material flow from the first end 74 of the first shaft to the second end 76 during the deforming process applied by the tool 58. Therefore, the assembly of the camshaft 26 may be completed without machining the bearing surfaces supporting the second set of lobe members 48, 50, 52, 54 on the first shaft 34.

Referring to FIG. 5, in another non-limiting example, an alternate fixture 160 is shown. The fixture 160 may include a frame 164 having a threaded bore 166 passing therethrough. A camshaft 126 may be engaged with the fixture 160. The camshaft 126 may be generally similar to the camshaft 26, with the exception of the end portion 162 of the first shaft 134. Rather than including a stop member, the first shaft 134 may be axially fixed to the fixture 160 through a threading 163 on end portion 162 being engaged with the threaded bore 166 of the frame 164. A tool 158, generally similar to tool 58, may be used to deform the first shaft 134 in a manner similar to tool 58 discussed above.

What is claimed is:

1. A method comprising:
   locating a first lobe member of a camshaft on a first shaft having an annular wall defining a bore, the first lobe member being located on a first portion of the first shaft and defining a first end of the camshaft;
   locating a second lobe member on a second portion of the first shaft, the second lobe member defining a second end of the camshaft;
   fixing the first shaft from axial displacement, the fixing including the first shaft being free from axial restraint in a first axial direction extending from the first portion of the first shaft to the second portion of the first shaft; and
   displacing a tool through the bore of the first shaft from the first portion of the first shaft to the second portion of the first shaft to fix the first lobe member to the first shaft, the tool including an outer radial surface engaged with an inner radial surface of the bore, the tool applying an outward radial force to the inner radial surface of the bore and displacing the annular wall into engagement with the first lobe member as the tool is displaced through the bore, the entirety of the first shaft located axially outward from the first portion toward the second portion being free from axial restraint during the displacing.

2. The method of claim 1, wherein the first shaft is continuously in axial tension along a length of the shaft during the displacing, the first shaft being in axial tension from the first portion to a location of the tool within the shaft during the displacing.

3. The method of claim 1, wherein the material forming the first shaft is continuously forced axially outward in the first axial direction during the displacing.

4. The method of claim 1, wherein an axial force applied to the first shaft by the tool is in a single direction during the displacing.

5. The method of claim 1, wherein the first shaft includes an end portion extending axially outward from the first lobe member in a second axial direction opposite the first axial direction, the fixing including fixing the first shaft from axial displacement at the end portion.

6. The method of claim 5, wherein the fixing includes supporting the end portion of the first shaft in a bore of a fixture and securing a stop member to the end portion of the first shaft, the fixture being located axially between the stop member and the first lobe member, the stop member abutting the fixture and preventing axial displacement of the first shaft relative to the fixture during the displacing.

7. The method of claim 5, wherein an outer surface of the end portion of the first shaft includes a threading, the fixing including threading the end portion into a threaded bore of a fixture to axially secure the first shaft relative to the fixture.

8. The method of claim 5, further comprising removing the end portion from the first shaft after the displacing.

9. The method of claim 1, wherein the displacing the tool includes forcing a spherical member through the bore.

10. The method of claim 1, further comprising locating a third lobe member on the first shaft, locating a second shaft within the bore of first shaft and fixing the third lobe member for rotation with the second shaft, the third lobe member being rotatable on the first shaft and the second shaft being rotatable within the first shaft.

11. A method comprising:
locating a series of lobe members of a camshaft on a first shaft having an annular wall defining a bore, a first of the lobe members being located on a first portion of the first shaft and defining a first end of the camshaft, a remainder of the lobe members being located on the first shaft in a first axial direction outward from the first lobe member, the first shaft including an end portion extending outward from the first lobe member in a second axial direction opposite the first axial direction;
fixing the end portion of first shaft to a fixture, the fixing limiting axial displacement between the first shaft and the fixture, the fixing including the first shaft being free from axial restraint in the first axial direction; and
displacing a tool through the bore of the first shaft in the first axial direction to fix at least one of the lobe members to the first shaft, the tool including an outer radial surface engaged with an inner radial surface of the bore, the tool applying an outward radial force to the inner radial surface of the bore and displacing the annular wall into engagement with at least one of the lobe members as the tool is displaced through the bore, an entirety of the first shaft located axially outward from the first portion in the first axial direction being free from axial restraint during the displacing.

12. The method of claim 11, wherein the fixing includes supporting the end portion of the first shaft in a bore of the fixture and securing a stop member to the end portion of the first shaft, the fixture being located axially between the stop member and the first lobe member, the stop member abutting the fixture and preventing axial displacement of the first shaft relative to the fixture during the displacing.

13. The method of claim 11, wherein an outer surface of the end portion of the first shaft includes a threading and the fixture includes a bore having a threading, the fixing including threading the end portion of the first shaft into the bore of the fixture to axially secure the first shaft relative to the fixture.

14. The method of claim 11, further comprising removing the end portion from the first shaft after the displacing.

15. The method of claim 11, wherein the first shaft is continuously in axial tension along a length of the shaft including an axially outward extent of the shaft from the first portion in the first axial direction during the displacing, the first shaft being in axial tension from the first portion to a location of the tool within the shaft during the displacing.

16. The method of claim 11, wherein the material forming the first shaft is continuously forced axially outward during the displacing.

17. The method of claim 11, wherein the displacing the tool includes forcing a spherical member through the bore.

18. The method of claim 11, further comprising locating an additional series of lobe members on the first shaft, locating a second shaft within the bore of first shaft and fixing the additional series of lobe members for rotation with the second shaft, the additional series of lobe members being rotatable on the first shaft and the second shaft being rotatable within the first shaft.

* * * * *